Jan. 31, 1950

A. J. HORNFECK 2,495,844

CONTROL SYSTEM

Filed June 6, 1946

INVENTOR.
ANTHONY J. HORNFECK
BY
Raymond D. Junkins
ATTORNEY

Jan. 31, 1950     A. J. HORNFECK     2,495,844
CONTROL SYSTEM Filed June 6, 1946                  7 Sheets-Sheet 3

INVENTOR.
ANTHONY J. HORNFECK
BY
Raymond D. Junkins
ATTORNEY

Jan. 31, 1950   A. J. HORNFECK   2,495,844
CONTROL SYSTEM

Filed June 6, 1946   7 Sheets-Sheet 4

INVENTOR.
ANTHONY J. HORNFECK
BY
Raymond W. Jenkins
ATTORNEY

FIG. 9

INVENTOR.
ANTHONY J. HORNFECK
BY
Raymond W. Jenkins
ATTORNEY

INVENTOR.
ANTHONY J. HORNFECK
BY
Raymond D. Junkin
ATTORNEY

Patented Jan. 31, 1950

2,495,844

UNITED STATES PATENT OFFICE 2,495,844

CONTROL SYSTEM

Anthony J. Hornfeck, Cleveland Heights, Ohio, assignor to Bailey Meter Company, a corporation of Delaware Application June 6, 1946, Serial No. 674,752

13 Claims. (Cl. 236—46)

My invention relates to electrical control circuits and particularly to electrical control circuits utilizing a measurement of a variable quantity, quality, position, or the like as the motivating basis for a control of the same or of another variable. A condition, quantity, quality, position or other variable which may be represented by an electrical value, such as resistance, potential or other electrical characteristic may be continuously and instantaneously measured through the agency of the circuit to be described. The measurement so obtained may be used to effect a control of the same or of another variable which may or may not contribute to the magnitude or change in magnitude of the variable being measured.

Representative of variable quantities, conditions and the like to which my invention is directed are such variables as rate of fluid flow, temperature, liquid level, pressure; although the variable may equally as well be the position in space of an object, the throttling position of a valve, or the like.

In the control of combustion or of other processes the time of response (process lag) of the system to a corrective change in the rate of application of an agent, following a departure of the controlled condition from its desired value, depends on various constructional and operating factors. Overtravel, hunting, or the like of a control system results in inefficiency, waste and excessive wear on equipment. To satisfactorily control the operation of different processes and apparatus several basic types of control are known and are widely used in pneumatic and hydraulic control systems. A principal object of my present invention is the embodiment in electrical and electronic circuits of the proven desirable features of control readily adaptable to a wide variety of process systems to be controlled.

By way of example only I have chosen to illustrate and describe my invention as applied to an electrically heated furnace wherein it is desired to maintain a uniform preselected temperature. It will be understood that such example is representative of a variable condition to be controlled through the application of an agent affecting the condition and is not to be taken as limiting.

The type of apparatus to be controlled frequently dictates the nature of the control which may be economically applied. In the control art two general types of control are recognized which are referred to as "on-off" and "modulating." In "on-off" control the controlled element, such as a fuel supply valve, for example, is in either open or shut position; or an electric heating resistor is turned on or off by a contactor. In "modulating" control the valve is positioned between its extremes of travel to modulate or throttle the rate of flow of fuel through the valve. A modulating control while preferable is usually a more elaborate and expensive type and is not readily applicable to controlled elements which have only two possible positions, such as a solenoid operated valve which has only an open and a shut position, or an electric heating resistor element to which the current is either on or off. Such "on-off" control is however at one or the other of two extremes and may lead to bad cycling.

The "dead band" of the controller is that range in temperature across the "standard" to which the controller is insensitive. In other words, a portion of the range of the instrument through which temperature may vary without effecting an actuation of the control. For example, assume that the range of the measuring controller is 0 to 1000° F. and the "control point" or desired standard temperature is 500° F. A desirable "dead band" might for example be the temperature between 499° F. and 501° F., a "dead band" of 2° F. Usually the possibility exists of moving the "dead band" without change along with the control point. This means that a "dead band" of 2° F. would exist across a control point of 450° F., 500° F., 700° F. or substantially any selected standard temperature in the given range of 0 to 1000° F. Under certain conditions of apparatus or circuit arrangement the dead band may vary slightly in width at different points in the measuring range. For the purpose of explanation, however, I assume that the dead band will remain substantially uniform across whatever control point is selected in the range of the instrument.

It will be appreciated that if the "dead band" is substantially non-existent, then the slightest variation in temperature in one direction or the other from the control point of 500° F. will result in an actuation of the controlled element and an undesirable cycling may occur with the resistor being turned on and off rapidly or too frequently when temperature remains almost exactly on the desired value.

If the "dead band" is too wide, then temperature will not be held closely, for it will require a decided change in temperature to actuate the controller. Temperature will have drifted so far away that when a change in the fuel supply rate is made over-regulation and hunting occur. The actual width of the dead band selected will depend, of course, upon the characteristics of the system in relation to how close the temperature of the furnace must be maintained.

So long as temperature is above standard, current to the furnace heating resistors is turned "off." If the temperature is at or below standard the current is turned "on." Obviously, the full heating effect of the resistor may be greater than is necessary to balance heat input to heat output for maintaining a uniform desired temperature. Preferably the amount of correction to rate of heat input should bear a relation to the extent of departure of temperature from standard. Modulating or throttling control tends to maintain the application of the corrective agent in accordance with the demand.

It is a particular object of my present invention to provide a controller for an "on-off" type of controllable apparatus embodying or incorporating the advantageous features of a "modulating" type of control. Basically, this result is accomplished by varying the proportion of "on-time" to the "off-time," giving the effect of a modulation related to the extent of departure of temperature from standard, and therefore to the actual value of temperature in relation to the standard value.

Figure 1:
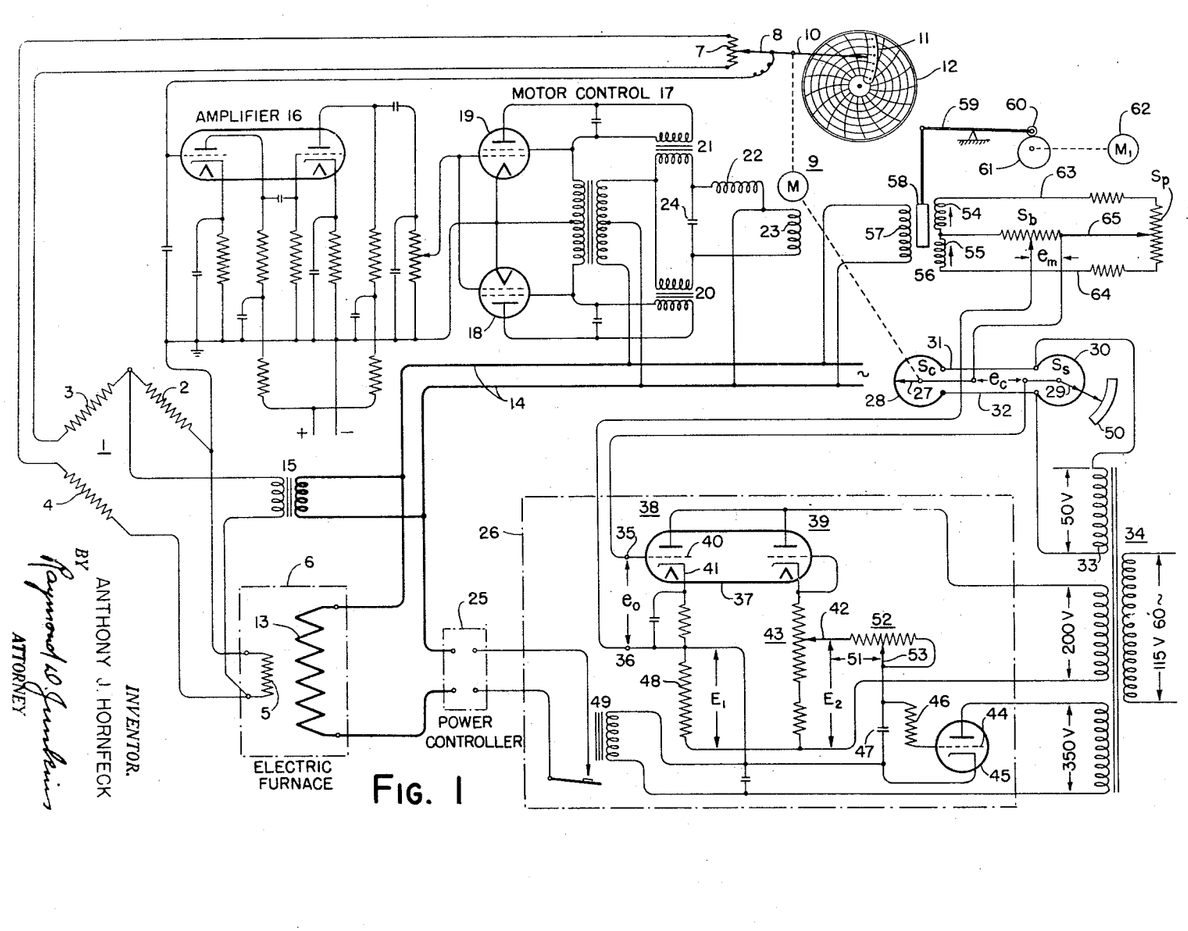
Fig. 1 is a measuring and control system in connection with a resistance thermometer.

All of the figures of the drawing are shown in quite diagrammatic or schematic manner. In Fig. 1 I have shown the amplifier and motor control circuit in detail. I have not felt it necessary to duplicate these details in other figures which illustrate modifications of a portion only of the complete circuit of Fig. 1.

Referring now in particular in Fig. 1, I indicate at 1 a phase sensitive A.-C. bridge having fixed resistor arms 2, 3 and 4. The fourth arm 5 of the bridge 1 is a resistance element located in an electric furnace 6 and sensitive to the temperature thereof. For balancing the bridge I provide an adjustable resistance 7 inserted between the arms 3 and 4 and provided with a movable contact arm 8 for proportioning the resistance 7 between the arms 3 and 4.

For positioning the contact arm 8 I provide a motor 9 which also positions an indicator 10 relative to a scale 11 and relative to a revoluble chart 12, thereby providing an instantaneous indication, as well as a continuous record, of the value of temperature to which the resistance arm 5 is sensitive.

The electric furnace 6 is preferably heated by an electric resistance element 13 receiving current from an A.-C. source 14, which also provides alternating current supplied to the bridge 1 through a transformer 15.

Preferably the bridge arm 5 is a platinum resistance measuring element. The conjugate corners of the bridge 1 are connected to an amplifier 16 and motor control 17 for the motor 9. For an understanding of the phase sensitive A.-C. bridge, for measuring the resistance of the leg 5 subjected to temperature of the furnace 6, reference may be had to the Ryder Patents 2,275,317 and 2,333,393. The voltage output of the bridge 1, supplied to the amplifier 16, assumes a balance or unbalance and a phase relation relative to the supply voltage dependent upon the magnitude and sense of the unbalance condition of the bridge. The amplifier 16 selectively controls motor tubes 18, 19, which in turn control the amount and direction of unbalance of saturable core reactors 20 and 21 for directional and speed control of the motor 9 adapted to position the arms 8 and 10.

The motor 9 is of an alternating current type having windings 22 and 23 ninety electrical degrees apart and also having a capacitor 24. When alternating current passes directly through one of the windings and simultaneously through the other winding in series with the capacitor the motor rotates in predetermined direction and at a speed determined by the extent of unbalance of the saturable core reactors 20, 21. It is not necessary to go into greater detail as to the construction and operation of the amplifier 16 and the motor control circuit 17, as reference may be had to the above mentioned Ryder patents.

In my present invention, in addition to providing an instantaneous indication and a continuous record of the value of temperature to which the arm 5 is subjected, I provide an electrical control of the heat input of the resistor 13 to the electric furnace 6. I have shown in this connection a power controller 25 which forms no part of the present invention. This may be any adaptable power controller for the resistance 13. My present invention resides in an electrical system intermediate the measuring system and the power controller, sensitive to the measuring system, and for turning on and off the power controller 25. Thus, upon departure of temperature within the furnace 6 from that which is desired, the power controller 25 is turned on or off to increase or decrease the heat of the furnace, tending to return the departed temperature to its desired value. The actual temperature is continuously indicated on the scale 11 and recorded on the chart 12.

The motor 9 in addition to positioning the contact arm 8 simultaneously positions a contact arm 27 over a slide-wire 28. At 29 I indicate a contact arm adapted to be manually positioned along a slide-wire 30 for establishing the temperature standard or control point to which the control works, i. e. the temperature value which is desirably to be maintained at the sensitive arm 5.

The elements 27, 28, 29 and 30 comprise what I term a balanceable control network including the joining conductors 31, 32. This circuit is supplied with A.-C. power through the secondary winding 33 of a transformer 34. Contact arm 27 is positioned relative to the slide wire 28 by the motor 9 representative of actual temperature to which the resistance arm 5 is sensitive. The contact arm 29 is positioned relative to slide wire 30 manually to a point representing the desired temperature. The control circuit including these elements then establishes a signal $e_o$ across the terminals 35, 36 of reversible phase and having a magnitude proportional to the unbalance of the control circuit.

The operation is as follows: If temperature within the furnace deviates from the desired value, then the resistance of the bridge arm 5 changes, causing an unbalance of the bridge 1 in one direction or the other dependent upon whether the actual temperature is above or below the desired temperature. The phase and magnitude of the A.-C. output of the bridge 1 follows the sense and amount of unbalance of the bridge and is applied to the amplifier 16 for control of the motor 9. The motor 9 rotates in predetermined direction and amount determined by the phase and amount of unbalance of the bridge 1 and positions the contact 8 along the slide-wire 7 in proper direction to rebalance the bridge. The amount of movement of the contact 8 over the slide-wire 7 to bring about such a rebalancing is representative of the deviation of the actual temperature from the desired temperaure, and herefore the indicator 10 continuously shows on the index 11 and chart 12 the actual temperature of the furnace.

At the same time the motor 9 has positioned the contact 27 along the slide wire 28 in consonance with the departure of the temperature from the desired temperature. With such movement of the contact arm 27 the control bridge including the elements 27, 28, 29, 30, 31, and 32 becomes unbalanced and an electrical value $e_o$ is established across the terminals 35, 36 representative of the direction and extent of such unbalance. Such signal is effective to actuate the relay 26 controlling the resistor 13 through the agency of power controller 25 in a direction to return the temperature of the furnace toward the desired standard.

As the temperature (due to a change in heating of the resistor 13) returns toward desired value the consequent temperature change at the resistance 5 unbalances the bridge 1 and causes the motor 9 to position the contacts 8 and 27 in proper direction and amount until the measuring bridge 1 and the control bridge are again balanced. It is appreciated, of course, that this action may be more or less continuous, i. e. before the temperature returns completely to its desired standard there may be other influences acting upon the furnace to prevent or to accelerate the return of the temperature to the desired value. In other words, the measuring circuit is continuously indicating the instantaneous temperature of the furnace and the control circuit is continuously regulating the power controller 25 to maintain the temperature at the desired value or standard. I will now describe the operation of the apparatus within the dotted enclosure 26 which I term an electronic relay. Such apparatus is under the control of the signal $e_o$ for regulating the power controller 25.

I have indicated as $e_c$ the unbalance potential which may exist between the contact arms 27 and 29 of the control bridge and which unbalance voltage may be of a phase and magnitude depending upon the direction and extent of unbalance. In describing the operation I am considering that $e_c = e_o$. In other words, for the present I consider that the unbalance $e_c$ is applied directly to the terminals 35, 36.

The magnitude of the control impulse $e_o$ is proportional to the deviation of the measured quantity from the control setting. The sense of the unbalance depends on whether the deviation is below or above the control setting, and determines the phase or polarity of the control impulse. This impulse is amplified or applied directly to the controller. The direction in which the controller operates to restore the measured quantity to standard is determined by the phase or polarity of the unbalance of the control bridge. A phase discriminatory device 37 is shown as a single envelope tube containing triodes 38 and 39 of which 39 is a rectifier whose function is to supply a reference D.-C. voltage $E_2$ for 38. The voltage $e_o$ at terminals 35, 36 is impressed between the grid 40 and the cathode 41 of triode 38 establishing a D.-C. voltage $E_1$ to be compared to $E_2$.

When the control bridge is in balance ($e_c=0$), i. e. when temperature (as represented by the relative position of 27, 28) is at the desired value (as represented by the relative position of 29, 30) triode 38 conducts a predetermined amount of current resulting in a voltage drop $E_1$. An adjustable contact 42 is manually positioned along a resistance 43 until $E_2$ is slightly less than $E_1$. The voltage difference between $E_1$ and $E_2$ is then applied to the grid 44 of a gas-filled tube 45, such as a Thyratron, through a resistor 46 and a capacitor 47. The negative voltage thus applied to the grid of the thyratron 45 is just large enough to prevent 45 from firing.

Inasmuch as the relay 26 being described provides an on-off control of the heating element 13 it will be appreciated that I desire to fire tube 45 and energize the mechanical relay 49 for the power controller 25 only when the temperature tends to fall below the desired standard value. When the temperature increases above standard or desired value the tube 45 does not fire or conduct. The unbalance voltage $e_o$ on an increase in temperature above the desired value, is in phase with the plate voltage of triode 38 and gives an increase in plate current over balance condition. This results in an increased voltage drop $E_1$ across the resistor 48.

When the temperature decreases from standard the control bridge becomes unbalanced and a voltage $e_o$ available across the terminals 35, 36 is supplied to the grid 40 of discriminator triode 38. Such voltage is out of phase with the plate voltage of 38 so that the plate current is reduced and $E_1$ becomes less than at balance. This reduces the negative voltage applied to the grid of thyratron 45 which fires, completing the circuit to energize relay 49.

Thus the relay 26 is sensitive to the phase of the voltage $e_o$ or to the direction of unbalance of the control bridge, which is the same as saying that the relay 26 is sensitive and responsive to a departure of actual temperature above or below the desired value of temperature. The system so far described comprises an on-off control. When temperature decreases below the desired value then the thyratron 45 is fired, the relay 49 is energized and the power controller 25 is so activated as to increase the heat applied to the furnace 6 so that the actual temperature effective at 5 will be raised toward the desired value. If the temperature increases above the desired value the control bridge becomes unbalanced in opposite sense, applying a voltage $e_o$ of opposite phase to the relay circuit 26, thereby shutting off the thyratron 45 to shut off the heat applied to the furnace 6.

The "control point" as it is sometimes termed in this art is the desired or "standard" temperature value indicated on a scale 50 by hand adjustment of the contact pointer 29 along the slide-wire resistance 30.

It will be appreciated that in the operation of a furnace there may be a sudden temporary drop in temperature such as would be caused by the opening and shutting of a door in the furnace wall. As such a temperature change is momentary only and is not indicative of a trend, it is desired that the control system disregard all changes in temperature whose duration is less than a predetermined time interval. I have, therefore, arranged the circuit so that such a temperature drop of a short duration will be ineffective to fire the thyratron 45. The tendency of course will be to fire the tube but the voltage across the condenser 47 cannot change as fast as does the voltage difference between $E_1$ and $E_2$ due to the fact that the condenser 47 holds its charge and tends to maintain its voltage in known manner. The rate at which the voltage across condenser 47 changes is determined by the size of 47 and by that portion 51 of a resistance 52 between the contact arm 53 and the contact arm 42. I thus designate the contact 53 as a "time delay adjustment" and provide that manually the contact 53 may be moved along the resistor 52 to adjust the time duration of a decrease in temperature which is ineffective to fire the tube 45. The basic values of the capacitor 47 and the resistor 52 give a ready possibility of a 20 to 1 range in time delay adjustment. For example, it is quite commercially possible that temperature decreases of a duration of 2, 5, 10 or possibly greater number of seconds will be considered as being temporary decreases only and will be ineffective to fire the tube 45. As previously mentioned, these time intervals are adjustable manually by moving the contact 53 along the resistance 52 and thus varying the value of the included resistance 51.

I have previously mentioned the term "dead band" of a controller or controlling instrument. In Fig. 1 I indicate a resistor 46 in the grid circuit of the thyratron 45. If the value of resistor 46 is large I get substantially no dead band, but I can introduce a dead band or increase it in value by decreasing the value of the resistor 46. This may readily be accomplished by substitution of fixed resistors and usually it is not necessary to change the value of the dead band for any given measuring controller after it is first installed and adjusted to the operating conditions desired in the furnace. In other words, in many instances it is not necessary or desirable to have the dead band adjustment readily changeable manually where it could be changed by unauthorized persons.

I will now describe the particular feature of my present invention wherein the proportion of "on-time" to "off-time" may be varied automatically to include in a basic "on-off" control system certain advantageous features of the "modulating" type of control system. I accomplish this by modifying the control bridge unbalance signal $e_c$ by a modulating signal $e_m$ to the end that the signal $e_o$ applied to the terminals 35, 36 is equal to $e_c$ plus or minus $e_m$.

Basically the system consists of introducing a periodically cycling signal $e_m$ in series or superimposed with the signal $e_c$ obtained from the deviation of a controlled variable from standard. The resultant signal $e_o$ is applied either directly or through the medium of an amplifier or electronic relay to operate an on-off controller, such as an electric contactor, solenoid valve, or the like.

The superimposed signal $e_m$ is the unbalance voltage of a modulating bridge including an adjustable resistance element $S_p$ and the secondary windings 54, 55 of a movable core transformer 56. The movable core transformer 56 has an A.-C. energized primary winding 57 variably coupled to the secondaries 54, 55 by means of a movable magnetic core member 58, which is slowly reciprocated back and forth across a central coupling relation with the windings 57, 54 and 55.

For cyclically positioning the core 58 I provide linkage 59 having a roller arm 60 riding an eccentric disc or cam 61 driven synchronously by a motor 62. The shape of the cam 61 is relatively immaterial and may be provided with lobes to allow more than one oscillation per revolution if desired. Furthermore, the shape of the cam 61 may be such as to introduce linear or non-linear reciprocation of the element 58 between the windings it serves to couple inductively.

Joining the elements $S_p$, 54 and 55 into a bridge network are outer conductors 63, 64 and a conjugate conductor 65. One end of the conductor 65 joins the mid-point of the bucking secondaries 54, 55 and the other end forms a movable contact arm engageable with the resistance $S_p$. Interposed in the conductor 65 is a resistance $S_b$ across which the unbalance voltage $e_m$ is taken in variable amount manually adjustable.

The magnetic core 58 is synchronously reciprocated at a slow frequency by the motor 62. Preferably this is about one complete cycle per minute although the minimum frequency should be several times as great as the natural frequency of hunting of the control system. The core is symmetrical about the center of the assembly of windings 54, 55, 57, so that when the position adjustment $S_p$ is at fifty percent, or mid-point, the unbalance voltage $e_m$ will build up to maximum and decay to zero first in phase and then out of phase with the supply voltage, which latter is the same as the plate voltage of the relay tube 38.

Under this condition and with the control bridge 27, 28, 29, 30, 31, 32 perfectly balanced, i. e. $e_c=0$, the relay 49 will be "on" exactly half the time. A deviation in the measured variable (temperature) from the standard desired will produce a control voltage $e_c$ alternately in phase and out of phase with the superimposed periodic signal $e_m$. As a result, the ratio of duration of the "in" phase to the "out" of phase signal is modified by the magnitude and phase of $e_c$. Hence if the controlled variable (temperature) is down from standard the "on" period of the relay 49 will increase in proportion to the magnitude of the deviation.

Figure 2:
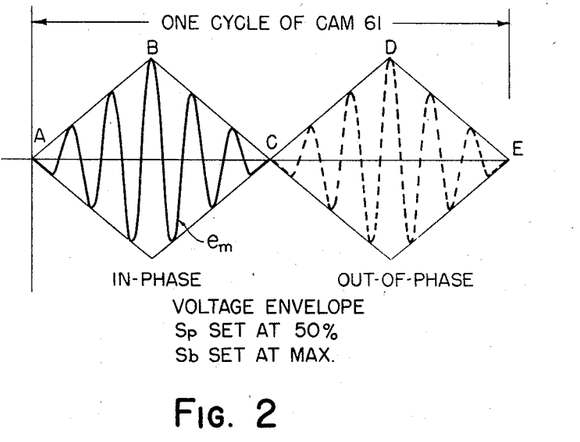
Figs. 2 and 3 are graphs of electrical characteristics in connection with Fig. 1.

Fig. 2 depicts a typical voltage envelope for the signal $e_m$ for one complete cycle of the cam 61, i. e. for one complete reciprocation cycle of the core 58 coupling the energized primary winding 57 with the bucking secondary windings 54, 55. Assume that the core 58 is at exactly the inductive midpoint of the windings corresponding to A (Fig. 2). The unbalance voltage $e_m=0$ in phase and magnitude. As the core moves away from neutral (A toward B in Fig. 2) a sixty cycle A.-C. voltage $e_m$ is developed, growing at a uniform rate from zero at A to a maximum at B, and of one phase which I designate as in-phase. As the core reverses its direction of motion and moves back toward neutral position the in-phase voltage $e_m$ decays to zero (B to C). It will be appreciated that the curves drawn within the envelope A—B—C of Fig. 2 are representative only and are a part only of the eighteen hundred alternations occurring in the one-half minute half cycle of cam 61.

As the core 58 passes the neutral point the signal $e_m$ passes through zero in magnitude (C) and reverses in phase producing an out of phase signal of magnitude growing along C—D and then decaying along D—E to zero. While actual values depend upon different circumstances I may say that the maximum value of the signal $e_m$ will be about two volts while the effective value of the signal (the R. M. S.) will usually be about one volt under the conditions of $S_p$ set at midpoint and $S_b$ set at Max.

Figure 3:
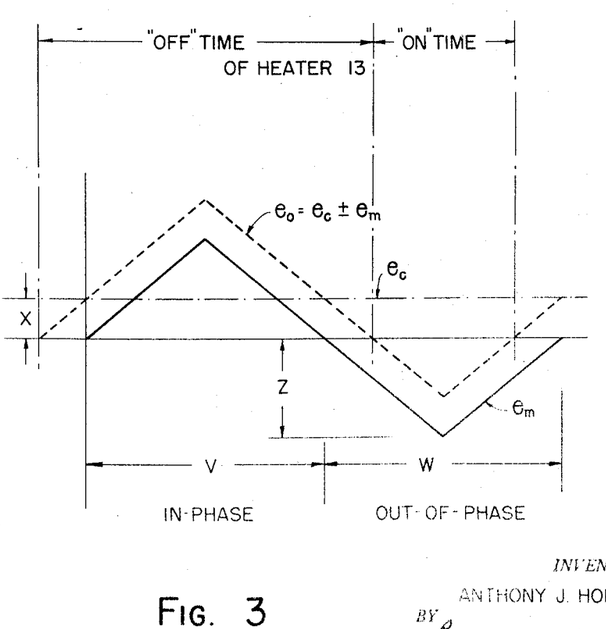

As clearly shown in Fig. 1 the modulating signal $e_m$ is superimposed on the control signal $e_c$ to produce the final signal $e_o$ which is applied to terminals 35, 36. The two signals are applied in series so that $e_o = e_c \pm e_m$. Refer now to Fig. 3. Herein I show in somewhat schematic manner the production of the final signal $e_o$ for one complete time cycle of cam 61. Although of alternating current I have assumed that the unbalance voltage $e_c$ has a uniform effective value of X above zero value base line. The full cycle of growth and decay in value of $e_m$ is shown in solid line. The resultant voltage signal $e_o = e_c \pm e_m$ is shown dotted. For the examples given the ratio of "on-time" to "off-time" of heater 13 is about .43.

As previously mentioned the voltage $e_o$ at terminals 35, 36 is impressed between the grid 40 and cathode 41 of triode 38, whose plate voltage is of supply phase. The relation of the two voltages as to phase and magnitude controls the D.-C. voltage $E_1$ which is to be compared to $E_2$. When the signal voltage $e_o$ is out of phase with the plate voltage of triode 38, the plate current is reduced and $E_1$ becomes less in comparison with $E_2$. This reduces the negative voltage applied to the grid of thyratron 45, completing the circuit to energize relay 49 and turning "on" the resistor (heat) 13. Thus the "out-of-phase" time of signal $e_o$ is the "on" time of supplying heat to the furnace 6. Obviously the arrangement could be reversed if desired.

The "proportional band" or "control band" is that temperature variation across the "control standard" which requires that the full heating capacity of the resistor 13 shall be "on" one hundred percent of the time, or shall be "off" one hundred percent of the time. In other words, if the "range" is 1000° F. and the "control point" is 500° F. a departure of temperature of Y° F. to a value of 500+Y, or to a value of 500—Y will dictate that the heater should be "off" one hundred percent of the time or "on" one hundred percent of the time respectively; on the assumption that the constants and characteristics of the system are such that when temperature is as the "standard" the heater is "on" fifty percent of the time and "off" fifty percent. At or beyond (500+Y)° F. nothing further can be done to lower the temperature than to completely turn off the heater. If the actual temperature is between 500 and 500+Y, then the heater should be off most of the time, but should be "on" a percentage of the time, decreasing as temperature departs from 500 toward 500+Y. At or below (500—Y)° F. nothing further can be done to raise the temperature than to have the heater turned on one hundred percent of the time. As temperature rises and approaches 500° F. the heater should be "off" an increasing percentage of the time. The width of the control band is 2Y° F.

I have previously shown that as the value of signal $e_c$ approaches the R. M. S. of signal $e_m$ (in phase) the heater "off" time increases until it is off one hundred percent of the time, when $e_c$ equals the effective $e_m$; and (out-of-phase) the heater "on" time increases to a full "on" value.

Assume that the R. M. S. of $e_m$ is one volt. Reference to Fig. 1 will show that I preferably supply the control bridge 28, 30, 31, 32 from the transformer 34 with a voltage of 50. Greatest possible unbalance of the control bridge, produced by maximum discrepancy between actual and desired temperature values (1000° F.) would give a value to $e_c$ of 50 volts. If $e_m = 1$ volt, then Y° F. requires that $e_c = 1$ volt (to be 100% "on" or "off") or 2% of 50 volts. Y then is 2% of 1000° F. or 20° F. and 2Y=40° F., which is the "control band" for the conditions stated. The relation is substantially linear over the entire range so that the control band equals ±20° F. on either side of a standard value or control point at various places along the range.

The maximum value Z of $e_m$ may be varied by manually moving the contact along resistance $S_b$ to pick off a desired portion of the unbalance in conductor 65. The magnitude of the "proportioning band" depends on the maximum value of $e_m$ and so can be adjusted simply by means of the $S_b$ potentiometer.

The ratio of the "in-phase" to the "out-of-phase" signal $e_m$ (v./w. in Fig. 3) may be readily and accurately adjusted by moving the contact 65 along the resistance $S_p$.

In Fig. 2 I have shown the boundary of the voltage envelope as comprising straight lines, a result which would be produced if the cam 61 is shaped to have a uniform rise and fall, thus providing a linear relation between movement and voltage. Under the same conditions the curves of Fig. 3 are straight lines. It will be appreciated that if the cam 61 is an off-center disc or eccentric, the relation will be sinusoidal and the boundary of the envelope of Fig. 2 as well as the $e_m$ and $e_o$ curves of Fig. 3 will emulate wave forms. I indicate here no distinct preference in the shape of cam 61 but believe that this may be well chosen differently for different types of processes and systems to be controlled. It is my contemplation that the cam 61 may be so shaped as to develop a desirable outline for the envelope of Fig. 2 and for the curves of Fig. 3. This provides one of the adjustable features of my invention along with possible variation in speed of rotation of the cam 61 as well as the possibility of providing said cam with a number of lobes of desired shape.

Figure 4:
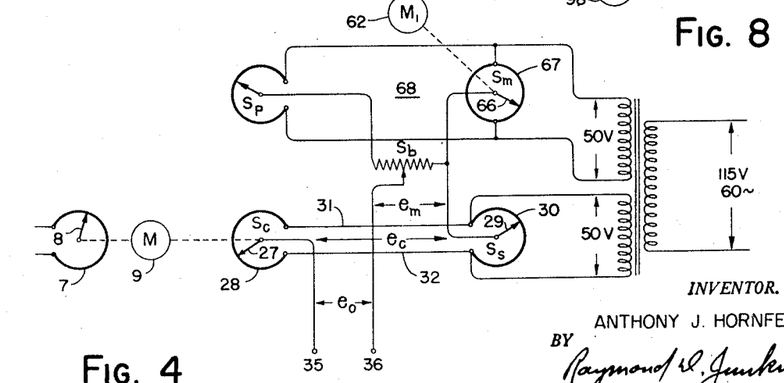
Fig. 4 illustrates a modification of a portion only of Fig. 1.

In Fig. 4 I show a modification of a part only of the complete circuit of Fig. 1. Inasmuch as this particular modification encompasses a variation only in the method of establishing a modulating signal $e_m$ it does not appear necessary to duplicate the measuring and controlling circuits of Fig. 1. It appears sufficient to describe how I propose to apply to the terminals 35, 36 a signal $e_o$ which is a composite of the signals $e_c$ and $e_m$ where the latter is cyclically produced in a manner somewhat different than is shown in Fig. 1.

In this modification the reciprocating magnetic core 58 is replaced by a resistance bridge modulator comprising a 360° slide-wire 67 tapped at two points 180° apart. The contact arm 66 is driven by a synchronous motor 62 and moves at a uniform rate along the slide-wire 67 alternately unbalancing the modulating bridge 68 in one direction or the other. The unbalance voltage $e_m$ provides an envelope having the characteristics of Figs. 2 and 3 with one complete cycle per revolution of the contact 66 over the slide-wire 67.

This modification has certain advantages and certain disadvantages over that of Fig. 1. It can be made into a very compact unit which can be located at will. On the other hand, it has the disadvantage of a sliding open contact as compared to the inductive coupling of Fig. 1. If the slide-wire 67 is accurately wound for linearity, the timing of the device will be a very accurate function of the position of the adjusting slide wire $S_b$. This may be used to accurately control the average rate of change of some controlled variable as illustrated in Fig. 5, which will now be explained.

Figure 5:
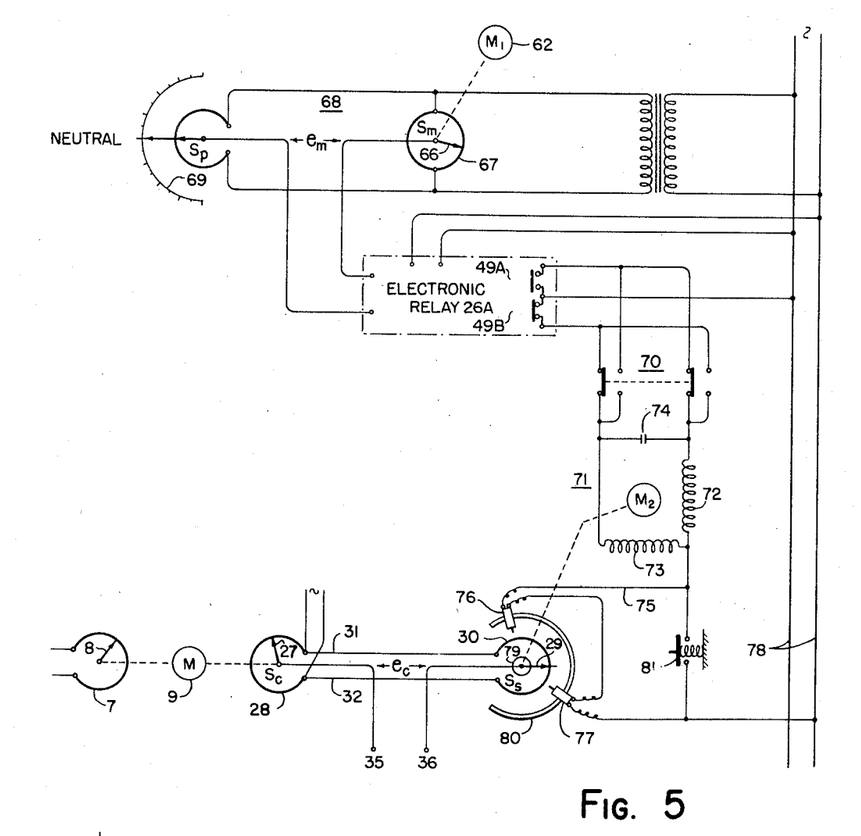
Fig. 5 is a modification of a portion of Fig. 1.

Certain elements of Fig. 5 are the same as those of Fig. 4 and bear the same reference numerals. A modulator bridge 68 includes the potentiometer $S_m$ having a continuous slide-wire 67 tapped at two points 180° apart and a contact arm 66 synchronously rotated around the slide-wire 67 through the agency of a motor 62. The adjustable potentiometer $S_p$ is provided with an index 69 which may be graduated in terms of "rate." As previously explained, the signal $e_m$ produced by the modulator bridge 68 fits an envelope such as is shown in Fig. 2 of linear growth and decay of voltage first "forward-phase" and then "reverse-phase." When the potentiometer $S_p$ is at neutral the ratio of "forward-phase" to "reverse-phase" is .50. Movement of the adjustment $S_p$ will vary the ratio of "forward-phase" to "reverse-phase" signal $e_m$.

The signal $e_m$ is applied to an electronic relay 26A similar to the relay 26 of Fig. 1, but provided with a normally open contact 49A and a normally closed contact 49B. The contacts 49A, 49B are connected through a two-position switch 70 to control direction of rotation of a capacitor-run motor 71 having windings 72 and 73, as well as a capacitor 74. A common terminal of the windings 72, 73 is joined by a conductor 75 in series through limit switches 76, 77 to one side of the power source 78.

The control bridge producing the unbalance signal $e_c$ includes the control potentiometer $S_c$ adjusted by the motor 9 along with the measuring potentiometer 7, 8. The "standard" potentiometer $S_s$ includes the resistance 30 and a contact arm 29, the latter adapted to be positioned by the motor 71 through the agency of a friction drive 79 in such manner that the contact arm 29 may be manually moved through the friction drive 79 relative to the motor 71. The arm 29 has a proper extension adapted to engage the limit switches 76, 77 which are individually mounted in an adjustable manner upon a track 80 which encircles the slide-wire 30. The arrangement is such that the limit switches 76, 77 may be separately, manually positioned along the track 80 to define the limits of travel of the contact arm 29 along the slide-wire 30. Due to the friction drive 79 the motor 71 may cause the arm 29 to engage either the limit switches 76 or 77 and thereafter to not stall or damage the motor 71. The arrangement described provides a means for smoothly and uniformly varying the "standard" to which the control system is to operate. This is accomplished by a smooth, continuous movement of the arm 29 along the slide-wire 30 whereby the value $S_s$ is continuously varied and at a "rate" dependent upon the proportion of the time that motor 71 is operating in one direction, i. e. depending upon the signal $e_m$.

Assume that $S_p$ is set at its neutral position for the bridge 68. The signal $e_m$ is alternately forward-phase and reverse-phase with respect to the voltage supplied to the relay 26A and the signals are of equal magnitude. The contact 49A will be closed one-half of the time and the contact 49B will be closed the other half of the time. Therefore, the motor 71 will rotate in one direction one-half of the time and in the other direction the other half of the time, and the net result will be that the travel of the arm 29 in either direction will cancel out and give the effect of no movement or change in "standard." It is obvious that the speed of rotation of arm 66 must be adjustable for various systems. If (considering an extreme condition) the forward-phase signal $e_m$ were of several minutes duration (and the reverse-phase signal $e_m$ of equal duration) the arm 29 would be driven to its limit of travel in one direction or the other with great disturbance in the value $e_c$. Proper forward-phase and reverse-phase time duration of the signal $e_m$ is probably in the nature of seconds to minimize the extent of travel of the arm 29 over the slide-wire 30. The net result desired is that the dictated position of the elements 29, 30 (representative of the desired "standard") will be unchanged so long as $S_p$ is at the neutral of the modulator bridge 68. So far, the end result, insofar as the signal $e_o$ applied to the terminals 35, 36 is concerned, is the same as described in connection with Fig. 4. It is true that the arrangement is somewhat different in that the electronic relay 26A controls the motor 71.

Movement of the potentiometer $S_p$ to one side or the other of neutral position varies the ratio of forward-phase to reverse-phase signals $e_m$ with consequent net effect of the motor 71 moving the arm 29 continuously in one direction along the slide-wire 30 and at a speed dependent upon the ratio of forward-phase to reverse-phase signals $e_m$.

Figure 6:
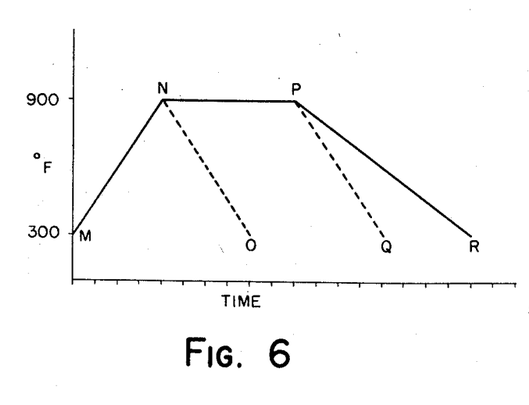
Fig. 6 is a graph of operation in connection with the arrangement of Fig. 5.

As the value $S_s$ continues to change in the same direction it influences the signal $e_c$ and the control system causes the actual value of temperature as represented by $S_c$ to continuously follow the uniformly varying "standards." Referring now to Fig. 6, I indicate that a desirable temperature may be maintained within the furnace 6 of uniform gradation between some arbitrary value of 300° F. and a second value of 900° F. uniformly changing over a given period of time as indicated in Fig. 6 as four units of time. The slope of the curve MN is the rate of change in temperature and such slope may be varied by the adjustment $S_p$ which varies the ratio of forward-phase to reverse-phase signal $e_m$.

In many processes, as for example in the heat treatment of metals, it is desired to vary the temperature within the furnace from one value to another at a uniform rate over a given period of time. Through the features of my invention just described this is readily possible.

If the complete range of the controlling instrument is for example 0–1000° F. and that is represented by the full extent of $S_s$, then the position of the limit switches 76, 77 positionable along the track 80 will represent any selected values M and N for maximum value of the "standard" to be maintained. Adjustment of the limit switches determines the temperature band MN while adjustment of $S_p$ determines the slope of the line MN or the "rate" of change in temperature desirably maintained in the furnace 6.

As shown in Fig. 5, the contact 49B is closed, which completes a circuit from the power source 78 directly through the motor winding 73 to the power source and through the capacitor 74 in series with the winding 72 across the power source. The motor thus moves in one direction of rotation. If the contact 49A is closed, and the contact 49B is open, then the winding 72 is directly across the power source, while the winding 73 is in series with the capacitor 74 across the power source and motor rotation is in reverse direction.

If the adjustment $S_p$ is moved in the opposite direction from its neutral, then the ratio between forward-phase and reverse-phase signal $e_m$ passes the unity mark and the predominance of motion of the arm 29 over the slide-wire 30 is in a decreasing direction, such as along the graph NO of Fig. 6.

In order however to obtain the temperature gradation MNO as shown in Fig. 6, it is necessary that the slope of the line NO be the same as the slope of the line MN. This dictates that $S_p$ would have to be set at exactly the same distance on the reverse side of its neutral as it was originally set. A more convenient way to obtain the graph MNO is to utilize the hand switch 70 when value N is reached.

Assume that $S_p$ has been adjusted to produce the increase in temperature curve MN and when the value of temperature N is reached it is desired to decrease the temperature of the furnace at exactly the same rate. When N (in terms of time) is reached the switch 70 is thrown manually to its reverse position and the predominance of forward-phase over reverse-phase (or vice versa) signals $e_m$ are thereafter applied to the windings of motor 71 producing reverse rotation, and consequently gradually moving the arm 29 back along its previous path over the slide-wire 30 with the result that the "standard" $S_s$ is reduced at the same rate NO that it was increased along MN.

It will thus be apparent that in Fig. 5 I have disclosed a ready means for controlling in accordance with a preselected rate of change in the variable, and to maintain the variable at such a preselected rate of change in either an increasing or a decreasing manner. I have provided a ready means for adjustably varying both ordinates of the plot of the variable against time, namely, an adjustment of the extreme values of the variable and of the slope of the increase or decrease. I have further provided ready means for reversing the trend of control at the previous rate or for thereafter manually varying the rate as desired.

In certain processes it is desirable to have a dwell, such as NP, to produce a temperature curve MNPQ for example. For example, in the heat treatment of certain metals it is desired to gradually raise the temperature to a preselected maximum, to then maintain this maximum over a certain period of time and to then gradually reduce the temperature to a preselected minimum. This is shown in Fig. 6 as MNPQ. With the features of Fig. 5 this may readily be accomplished.

I have previously mentioned that the graph MN is accomplished by net movement of the motor 71 in one direction, thereby moving the contact arm 29 for example from the limit switch 76 to the limit switch 77. When either limit switch is engaged, the conductor 75 is disconnected from the power source 78. The motor thus stops and the "standard" $S_s$ remains unvarying, producing the dwell NP until the "standard" is again changed manually, or started manually into automatic control thereof.

Referring to Fig. 6, I indicate that after a dwell of six time units at a controlled temperature standard of 900° F. the operator reverses the switch 70 to dictate reverse rotation of the motor 71 and then momentarily depresses the push button 81 which by-passes the limit switches 76, 77 and energizes the motor 71 for a sufficient length of time to back the contact arm 29 away from the limit switch it had previously engaged thus allowing the limit switch to close circuit. Thereafter the push button 81 may be released and current for the motor 71 is available through the limit switches 76, 77 as previously, and with the motor 71 rotating in reverse direction to produce the graph PQ.

Figure 7:
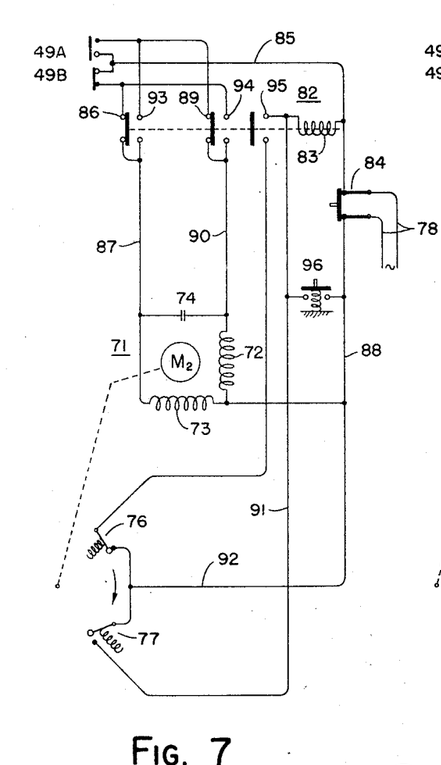
Figs. 7 and 8 diagrammatically illustrate modifications of the circuit shown in Fig. 5.

It is frequently desired to produce a controlled temperature graph MNO completely automatically without the necessity of manual manipulation to reverse motor rotation by means of the switch 70 when N is reached. In Fig. 7 I show a possibility of automatically carrying out the temperature cycle MNO. Herein the manually actuated switch 70 has been replaced by a magnetic relay 82 having a winding 83. The circuit is shown in Fig. 7 for a condition wherein the motor 71 is moving the contact arm 29 in clockwise direction from limit switch 76 toward limit switch 77. Assuming the instantaneous condition when contact 49B is closed, then the circuit path of the motor 71 may be readily traced. When the contactors 49A, 49B reverse the motor rotation reverses.

Assume first the condition with arm 29 moving clockwise and eventually engaging limit switch 77, closing the same. This completes a circuit 78, 84, 83, 91, 77, 92, 88, 84, 78 energizing relay 83 which opens contacts 86 and 89 and closes contacts 93, 94 and 95. Contacts 93 and 94 reverse direction of rotation of the motor 71 relative to the contacts 49A and 49B. Contact 95 latches in the relay coil 83 through closed limit switch 76.

The energization of winding 83 immediately starts motor 71 to moving the contact arm 29 in net counterclockwise direction along the path NO (Fig. 6) which continues even after arm 29 has backed away from limit switch 77, opening the same. The rotation will continue in counterclockwise direction until limit switch 76 is reached and opened deenergizing 83. which immediately initiates a net reversal of the motor with the result that if left alone the system would continuously cycle over a path MNO. To stop such a cycle at point O, or in fact at any point along the line MNO, it is only necessary to open switch 84, which kills motor 71 and leaves the arm 29 at a value of $S_s$, which thereafter dominates the controller.

When the arm 29 is stopped (by opening switch 84) at limit switch 76 or any location toward 77, a closure of switch 84 will cause the arm 29 to start moving toward limit switch 77. If the arm 29 has been stopped at some intermediate position and it is desired to dwell at that position it is necessary only to leave the switch 84 open for the desired length of the dwell. If it is desired to continue on an increasing temperature curve, then it is only necessary to close the switch 84. If it is desired from the dwell to start a decreasing temperature rate, then after the switch 84 is closed it is possible to momentarily depress the switch 96 long enough to energize relay 82, which immediately locks in through the limit switch 76 and results in counterclockwise movement of the arm 29.

Figure 8:
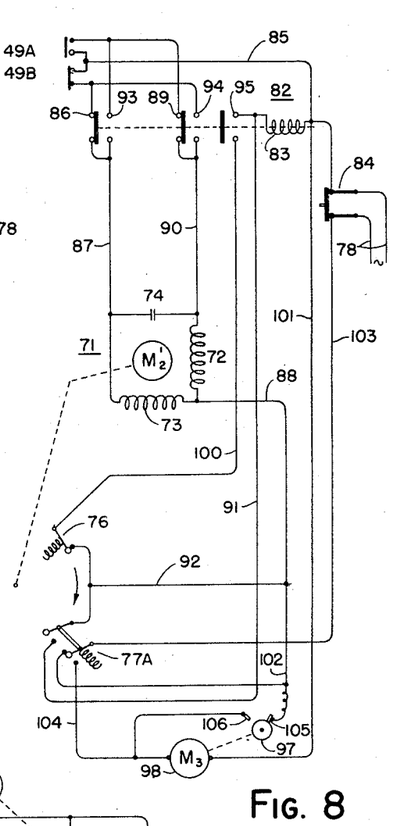

In Fig. 8 I show a modification of Fig. 7 wherein the length of dwell NP may be preselected and the path MNPQ automatically attained. The principal differences consist in the addtion of a timer 97 driven by a synchronous timing motor 98 and a change in the nature of the limit switch 77A. Herein, as in Fig. 7, the circuit is shown with the motor 71 positioning the arm 29 in a clockwise direction somewhere intermediate the limit switches 76, 77A. The circuit is similar to that of Fig. 7 except that intermediate the switch 84 and the conductor 88 the power line is connected by conductors 102, 103 through a normally closed finger of the limit switch 77A.

When the arm 29 engages the limit switch 77A the circuit is closed (as in Fig. 7) between the conductors 92 and 91 for energizing the reversing relay 82. However, at the same time the limit switch 77A breaks circuit 102—103 and prevents the relay 82 from being energized. Simultaneously, however, circuit is closed between the conductors 103 and 104 which energizes the synchronous motor 98 through the conductor 101 to the main switch 84. The motor 98 synchronously drives the timer 97, which has provision for manually adjusting the time length of rotation before a movable contact 105 engages a stationary contact 106 closing circuit between the conductors 102, 103. This preselected increment of time is the desired length of dwell NP.

When contact 105 engages contact 106 power is available through a circuit 88, 92, 77A, 91 to energize winding 83, which then locks itself in through 95, 100, 76, 92, 102, 105, 106, 77A, 104, 103. As arm 29 backs away from limit switch 77A the motor 98 is deeneergized, as is contact 106. In other words, the motor 98 operates, and the contacts 106, 105 are operative, only when the arm 29 is at its limit of travel depressing the limit switch 77A to the alternate position of that shown in Fig. 8.

As soon as the motor 71 begins to move arm 29 in counterclockwise direction it releases limit switch 77A, which returns to the position shown in Fig. 8. Motor 71 continues to move arm 29 in counterclockwise rotation until the latter engages limit switch 76 and opens the same, thus stopping the motor by deenergizing relay winding 83. The system has produced the time curve MNPQ. The length of NP is adjustable on the timer 97. The rate slope MN and PQ are the same, as adjusted on Sp. As previously mentioned, the decay slope may be varied (as PR) by manually shifting the rate adjustment Sp when time location P is reached.

Following the cycle MNPQ the relay 83 is deenergized and the complete cycle would immediately begin to repeat unless the operator at that time opens the main switch 84. This is in any event advisable because many variables enter into the desirability of immediately repeating the complete cycle or predicting how long the time dwell should be had at the lowermost temperature. Such a time dwell depends, of course, upon certain things such as the time necessary to unload or reload a furnace or process.

Figure 9:
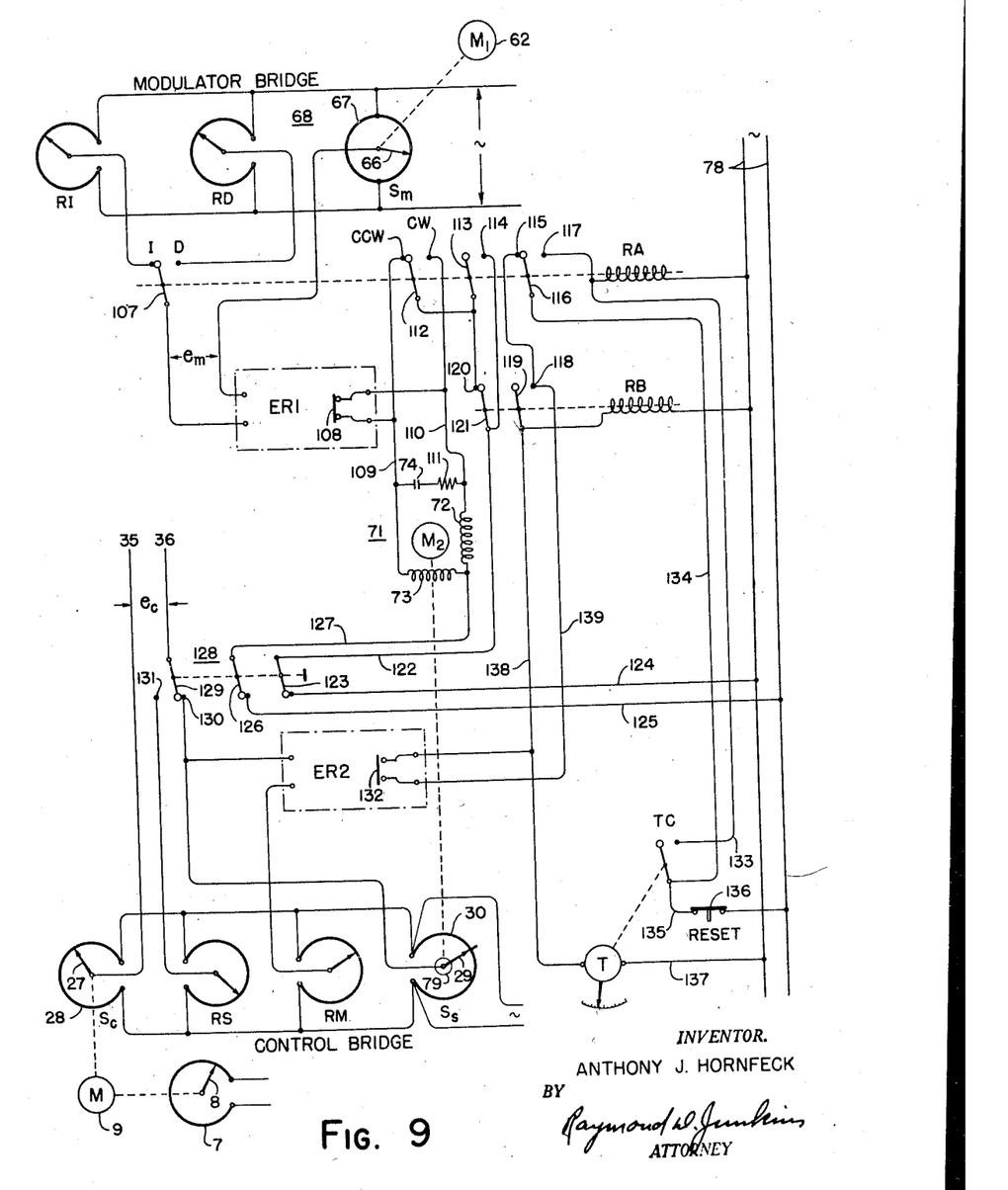
Fig. 9 is a circuit diagram of a modification of a part of Fig. 1.
Figure 10:
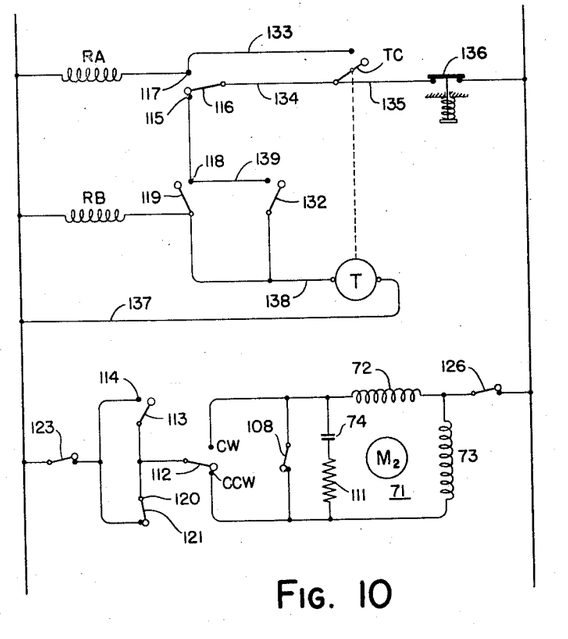
Fig. 10 is a simplified across-the-line diagram of Fig. 9.
Figure 11:
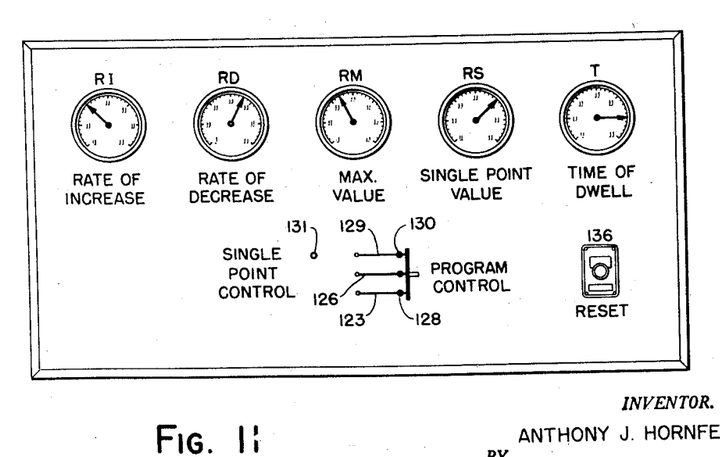
Fig. 11 is a suggested control panel board arrangement in connection with Figs. 9 and 10.

In Figs. 9, 10 and 11 I show a modification of the arrangement described in connection with Figs. 5, 6, 7 and 8. The arrangement is such as to provide the possibility of automatically performing a complete cycle MNPR (Fig. 6) or of selectively utilizing hand control. Fig. 9 shows the complete circuit intermediate the measuring slide-wire 7, 8 and the output signal supplied to terminals 35, 36. Fig. 10 includes certain elements of Fig. 9 shown in "across-the-line" manner for ready circuit tracing. Fig. 11 depicts the face of a panel board which contains the various hand adjustable elements of Figs. 9 and 10. In the following description reference should be made to Figs. 9, 10 and 11.

I show the modulator bridge 68 (producing the signal $e_m$) as having a "rate of increase" potentiometer RI and a "rate of decrease" potentiometer RD in addition to the synchronously driven potentiometer $S_m$. The potentiometers RI and RD are selectively included in the bridge circuit 68 by a contact arm 107 engaging either contact I or contact D in the alternate positions of a relay RA. The potentiometers RI and RD respectively refer to and preset the rate of increase or rate of decrease of the variable, namely, the slope of the line MN and of the line PR (Fig. 6). These potentiometers RI and RD are hand adjusted with reference to graduated scales bearing the same titles on the suggested panel board of Fig. 11.

The premise used in describing Figs. 9, 10 and 11 is that the control is operating in an increasing temperature direction somewheres along the line MN between M and N. Therefore the switch arm 107 is contacting at the point I with relay RA deenergized. This predicts that the modulator bridge 68 includes the elements RI and $S_m$ but does not include the element RD. The output of bridge 68, namely, signal $e_m$, produces a "forward-phase" and a "reverse-phase" signal similar to that shown as a voltage envelope in Fig. 2.

Figure 12:
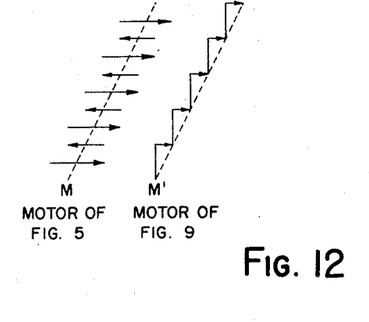
Fig. 12 is a diagram comparing the operation of the motors of Figs. 5 and 9.

The signal $e_m$ is applied to an electronic relay ER1 having a normally closed contact 108, which is connected directly across the conductors 109, 110 of the motor 71. The contact 108 parallels the motor capacitor 74 and a resistance 111, for shorting out the same (when closed) and plugging the motor. Direction of rotation of the motor 71 is either clockwise or counterclockwise, dependent upon whether the contact arm 112 of the relay RA engages CCW or CW. As shown, the motor is connected for CCW rotation during the portion of the time that contact 108 is open. As previously explained, the proportion of "open" to "closed" time of the contact 108 is related to the relation of "forward-phase" to "reverse-phase" of the signal $e_m$. Inasmuch as the motor 71 rotates only when the contact 108 is open, and then only in either CW or CCW direction, the motor operation differs somewhat from that previously described. Referring to Fig. 12, it will be observed that the progression of slope MN is accomplished by the motor of Fig. 5 as a difference between the CW and CCW alternate movements of the motor. In other words, as previously explained, the motor rotates a small amount CW and then a small amount CCW alternately, and the progression is by the difference of said movements, both as to slope (rate) of the line and the direction of preponderance determines the direction of movement. On the other hand the motor of Fig. 9 moves only in a single direction and inches along by the duration of the $e_m$ signals which "open" contact 108. Those $e_m$ signals which "close" contact 108 short the capacitor 74 and plug the motor to a stop. Direction of rotation is controlled entirely by the position of the contact arm 112 engaging either CCW or CW. In the example being described in connection with Fig. 9 the motor 71 is rotating CCW at a rate determined by the position of RI and upwardly along the increase line MN.

The circuit for CCW motor rotation may be traced; 78, 125, normally closed contact 126, 127, (winding 73) (winding 72, resistor 111, capacitor 74), 109, contact CCW, 112, 120, 121, 122, 123, 124, and power source 78. The circuit for CW rotation is as follows: 78, 125, 126, 127, (73, 74, 111) (72), 110, CW, 112, 113, 114, 122, 123, 124 and 78.

Turning now to the control bridge originating the signal $e_c$, it will be observed that the bridge includes the control potentiometer $S_c$ positioned by the balancing motor 9 along with the measuring balancing potentiometer 7, 8 so that the value of $S_c$ is representative of the actual temperature being measured. The bridge also includes the standard potentiometer $S_s$ wherein the position of the contact arm 29 along the slide-wire 30 is representative of the desired standard temperature to be maintained at any instance, up to a maximum value preset by hand adjustment of potentiometer RM. The signal $e_c$ is the unbalance of the bridge including potentiometers $S_c$ and $S_s$, namely, a signal of phase and magnitude showing the discrepancy, if any, between the actual temperature (value of $S_c$) and the desired or standard temperature (the value of $S_s$) where the latter is being continually changed according to the program desired.

The output of that portion of the bridge including the potentiometers RM and $S_s$ is applied to an electronic relay ER2 having an output contact 132 normally open; and close circuited only when the standard value $S_s$ reaches the preselected maximum standard RM.

The control bridge includes a hand set single control point value RS whose contact arm is connected to a terminal 131 and whose function will later be described.

The drawing of Fig. 9 includes a timer T having a contact TC which is normally open circuited and which becomes closed after the timer T has rotated for a preselected length of time. When the timer motor is thereafter deenergized a spring return opens the contact TC and resets the time element so that a preselected interval of time of operation of the motor T must be had before TC is again closed. I will now describe the general operation of the circuit.

Assume that the actual temperature is intermediate the points M and N, increasing at a preselected rate along MN determined by the setting of RI, driving the motor 71 in proper direction to position the contact arm 29 of $S_s$ in proper direction and speed so that the output signal $e_c$ produces a control which advances temperature along the line MN.

When a predetermined maximum temperature N is reached as evidenced by the value $S_s = RM$, and the signal applied to ER2 becoming zero, then contact 132 closes. This completes circuit 78, 137, T, 132, 139, 118, 115, 116, 134, 135, 136, 78, starting the timer motor T. It also completes the circuit 78, RB, 138, 132, 139, 118, 115, 116, 134, 135, 136, 78, to energize the relay RB. Energization of the relay RB opens contact 120—121, deenergizing contact 112, and thereby stopping motor 71 from shifting $S_s$ away from the value RM which it had just attained.

Stopping of the motor 71, which leaves $S_s$ at a maximum value preset at RM, means that the actual temperature has reached the plateau NP (Fig. 6) and such value will be maintained so long as $S_s$ is not moved. This value $S_s$ will not be varied until the timing motor T has rotated its preselected length of time and engages to close contact TC at a time P (Fig. 6). In other words, the timer is set for an interval of time corresponding to the time length of the desired dwell NP. When such interval of time has been expended, then contact TC is closed. During this time interval the signal supplied to the relay ER2 remains zero and the contact 132 is held closed to complete circuits through the relay RB and the timing motor T. Energization of the relay RB also effects a closing of the contact 119—118 to short circuit the switch 132 and assure a holding of the circuits through the relay and the timing motor closed.

Closure of TC completes a circuit 78, 136, 135, TC, 133, RA, 78, energizing relay RA which locks itself in through a circuit 78, 136, 135, 134, 116, 117, RA, 78. At the same time energization of RA causes a movement of contact 116 from 115 to 117, a closure of 113—114, a movement of contact 112 from CCW to CW, and a movement of contact 107 from I to D. Movement of the contact 116 away from 115 results in a breaking of the circuits through the relay RB and the timing motor T. Contact 121—120 is then completed and contact 119—118 broken as a result of the deenergizing of relay RB. The timing motor T resets itself and opens the contact TC as soon as it is deenergized. The relay RA remains energized as a result of the holding circuit established by a closure of contact 116—117. The movement of contact 112 to CW and the closing of contact 113—114 results in a circuit from the motor 71, through CW, 112, 113, 114, 122, 123, 124 to the power line 78 so that immediately motor 71 begins to rotate in CW direction, moving contact 29 in direction opposite to which it had previously moved and decreasing the value of $S_s$. Controlled temperature now begins to decrease along path PR or PQ at a rate determined by the setting of RD by reason of the engagement of contact 107 with D during the time that the motor is connected for rotation in CW direction. It will be appreciated that the closing of contact 120—121 will complete the circuit for operating the motor in the reversed direction but, in order that the motor 71 may start in the reversed direction as soon as the timing motor opens the contact TC, the contact 113—114 is closed to short circuit the contact 120—121 when the relay RA is energized.

The value $S_s$ is now gradually reduced as predicted by the setting RD until the arm 29 reaches a predetermined minimum value as limited by a mechanical limit. The potentiometer $S_s$ may be provided with limit switches 76, 77 as previously described in connection with Fig. 5, and these may be readily connected into the electric circuit of the motor 71 to stop the same. However, in the present description it is only necessary to move the arm 29 until it engages a limit stop whereupon the slip clutch 79 will keep the motor 71 from being damaged and will allow the controlled temperature to be maintained on a dwell at a value R until otherwise varied.

While it would be possible to predetermine the time length of the dwell at value R, this is not usually required, for after the process cycle has been accomplished it may be necessary to remove the charge from the furnace and to replace it with a new charge, and thus the time interval at value R may be of indeterminate length.

Whenever it is desired to restart the cycle MNPR it is necessary only to momentarily depress the spring closed reset push button 136 which deenergizes RA and permits the contact arms 107, 112, 113 and 116 to move to their original positions. Immediately the system is in the condition shown in Fig. 9 and ready to begin a cycle along the line MNPR.

If at any time along an increasing or decreasing control line, such as MN or PR, it is desired to level off or dwell it is necessary only to throw the 3-pole switch 128 and move the hand adjustable potentiometer RS to the value of temperature to be maintained as a single point control. Throwing the switch 128 opens contacts 123 and 126, completely deenergizing the control circuit of motor 71. Swinging the arm 129 from the contact 130 completely disconnects the signal $e_c$ from ER2, RM, $S_s$ and upon engaging the terminal 131 places the control bridge comprising $S_c$ and RS directly to produce a signal $e_c$. Thereafter in accordance with the hand set value of RS the signal $e_c$ will depend upon discrepancy between $S_c$ and RS to maintain the actual temperature at the preselected value RS so long as may be desired. At any time thereafter the system may be returned to program control by throwing the switch 128 into the position shown in Fig. 9.

Figure 13:
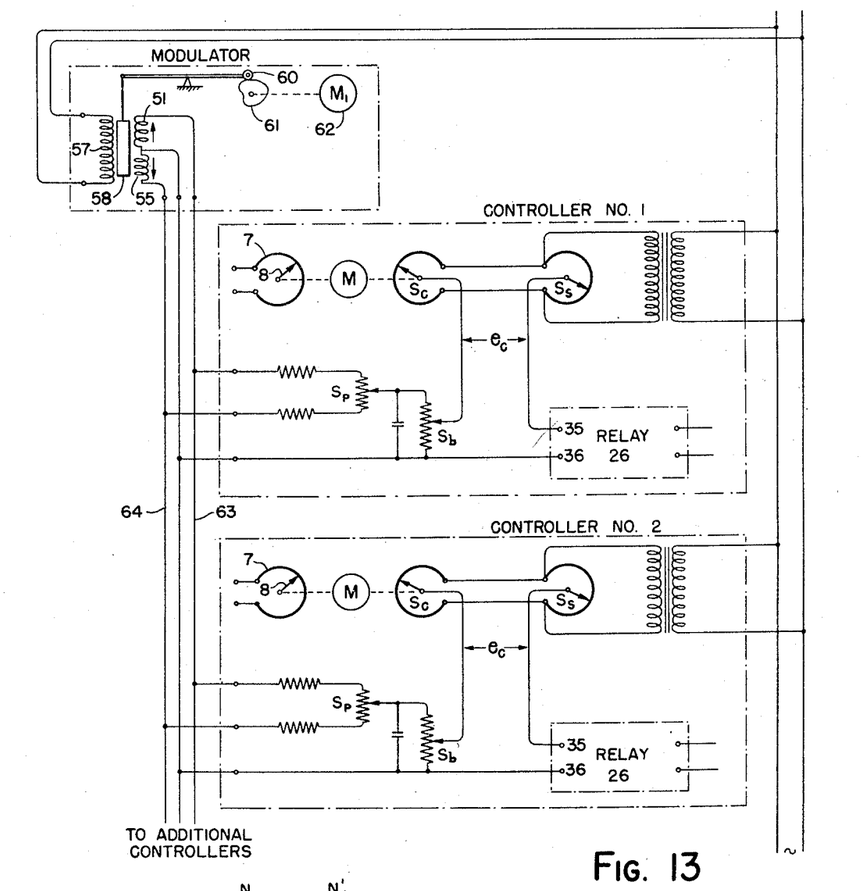
Fig. 13 illustrates how the circuit of Fig. 1 may be pluralized.

In Fig. 13 I show a modification of Fig. 1 wherein a single modulator may serve a plurality of controllers. In view of the explanation of Fig. 1 it seems unnecessary to go into detail as to the circuit of Fig. 13.

It will be appreciated from the above detailed description that my invention has wide application and is not limited to the specific examples illustrated and explained. While I have described a single embodiment comprising the control of an electric furnace it will be appreciated that the invention is equally applicable to fuel fired furnaces, or in fact, to the control of other variables than temperature.

Certain features of my present invention, originally disclosed and claimed herein, are disclosed and claimed in my copending divisional applications S. N. 68.027, filed December 29, 1948, and S. N. 104.870 filed July 15, 1949.

What I claim as new, and desire to secure by Letters Patent of the United States, is:

1. A furnace control system comprising a furnace; a heater for said furnace; an "on" and "off" control device for the heating medium for said heater; a temperature indicating system for said furnace including a network having an element responsive to furnace temperature adapted to unbalance the same, and rebalancing means for the network including a reversible motor for indicating the degree of unbalance and hence the temperature; a balanceable control bridge having connected, commercial frequency alternating current energized potentiometers each with a slider, one slider being connected for movement by said motor, means to adjust the other slider to designate a desired standard temperature for the furnace; phase sensitive means energized from the alternating current signal potential developed between said sliders to actuate said device to "on" when the furnace temperature is below said standard and to actuate said device to "off" when the temperature is above said standard; means to produce an alternating current signal potential of the said commercial frequency periodically cycling at a slow rate between zero and a maximum with alternate cycles in and out of phase with said first signal potential; and means to combine said signal potentials for joint control of said device.

2. A furnace control system comprising a furnace; a heater for said furnace; an "on" and "off" control device for the heating medium for said heater; a temperature indicating system for said furnace including a network having an element responsive to furnace temperature adapted to unbalance the same, and rebalancing means for the network including a reversible motor for indicating the degree of unbalance and hence the temperature; a balanceable control bridge having connected, commercial frequency alternating-current energized potentiometers each with a slider, one slider being connected for movement by said motor, means to adjust the other slider to designate a desired standard temperature for the furnace; phase sensitive means energized from the alternating-current signal potential developed between said sliders to actuate said device to "on" when the furnace temperature is below said standard and to actuate said device to "off" when the temperature is above said standard; means to produce an alternating current signal potential of the said commercial frequency periodically cycling at a slow rate between zero and a maximum with alternate cycles in and out of phase with said first signal potential; means to combine said signal potentials for joint control of said device; and means to regulate the ratio of "in phase" to "out of phase" time in said second signal.

3. The system of claim 1 in which means is provided to adjust the potential of said second signal to effect changes in the "proportioning band" of furnace control.

4. A furnace control system comprising a furnace; a heater for said furnace; a relay for "on" and "off" control of the heater; a temperature measuring system for said furnace including a network having an element responsive to furnace temperature adapted to unbalance the same and rebalancing means for the network including a reversible motor for indicating the degree of unbalance and hence the temperature; a balanceable control bridge having connected potentiometers each with a slider, a source of commercial frequency alternating current for energizing the bridge; one slider being connected for movement by said motor; means to adjust the other slider to determine a standard temperature for the furnace; a conjugate conductor connecting said sliders to provide an alternating current signal potential of reversible phase; phase sensitive means adapted to close said relay when the furnace temperature is below said standard and to open the relay when the temperature is above said standard; means to produce an alternating current signal potential of the said commercial frequency whose R. M. S. value periodically cycles at a slow rate between zero and a maximum with alternate cycles "in" and "out" of phase with said first signal potential; and means to combine said signal potentials for joint control of said phase sensitive means.

5. A control means for a system comprising in combination; a conditioning means for said system, an "on" and "off" controller for said conditioning means; a condition indicating apparatus for said system including power means responsive to system condition; a balanceable control bridge having connected, commercial frequency alternating current energized potentiometers each with a slider, one slider being connected for movement by said power means, means to adjust the other slider to designate a desired standard condition for the system; phase sensitive means energized from the alternating current signal potential developed between said sliders to actuate said controller to "on" when the system condition is below said standard and to actuate said controller to "off" when the system condition is above said standard; means to produce an alternating current signal potential of said commercial frequency periodically cycling at a slow rate between zero and a maximum with alternate cycles having the commercial frequency potential in and out of phase with said first signal potential; and means to place said signal potentials in joint control of said "on" and "off" controller.

6. A control means for a system comprising in combination; a conditioning means for said system; an "on" and "off" controller for said conditioning means; a condition indicating apparatus for said system including power means responsive to system condition; a balanceable control bridge having connected, commercial frequency alternating current energized potentiometers each with a slider, one slider being connected for movement by said power means, means to adjust the other slider to designate a desired standard condition for the system; phase sensitive means energized from the alternating current signal potential developed between said sliders to actuate said controller to "on" when the system condition is below said standard and to actuate said controller to "off" when the system condition is above said standard; means to produce an alternating current signal potential of the said commercial frequency periodically cycling at a slow rate between zero and a maximum with alternate cycles having the commercial frequency potential in and out of phase with said first signal potential; means to place said signal potentials in joint control of said "on" and "off" controller; and means to set the ratio of "in phase" to "out of phase" time in said second signal.

7. A control means for a system comprising in combination; a conditioning means for said system, an "on" and "off" controller for said conditioning means, a condition indicating apparatus for said system including an element responsive to system condition and a reversible motor for indicating the condition; a balanceable control bridge including connected potentiometers each with a slider, one slider being arranged for movement by said motor, means to adjust the other slider to designate a desired standard condition for the system; a source of commercial frequency alternating current energizing said bridge; phase sensitive means energized from the alternating current signal potential developed between said sliders to actuate said controller when the system condition departs from said standard to return the same toward said standard; means to produce an alternating current signal of normal frequency periodically cycling in potential at a slow rate between zero and a maximum with alternate cycles having the commercial frequency of opposite phase; and means to modify said controller actuation by said second signal potential.

8. A control means for a system comprising in combination; a conditioning means for said system, an "on" and "off" controller for said conditioning means; a condition indicating apparatus for said system including an element responsive to system condition and a reversible motor for indicating the condition; a balanceable control bridge including connected potentiometers each with a slider, one slider being arranged for movement by said motor, means to adjust the other slider to designate a desired standard condition for the system; a source of commercial frequency alternating current energizing said bridge; phase sensitive means energized from the alternating current signal potential developed between said sliders to actuate said controller when the system condition departs from said standard to return the same toward said standard; means to produce an alternating current signal of normal frequency periodically cycling in potential at a slow rate between zero and a maximum with alternate cycles having the commercial frequency of opposite phase; means to modify said controller actuation by said second signal potential; and means to predetermine the rate of said modification.

9. A furnace control system comprising a furnace, a heater for said furnace, an "on" and "off" control device for the heating medium for said heater, a temperature indicating system for said furnace including a network having an element responsive to furnace temperature adapted to unbalance the same, and rebalancing means for the network including a reversible motor for indicating the degree of unbalance and hence the temperature, a balanceable control bridge having connected, commercial frequency alternating current energized potentiometers each with a slider, one slider being connected for movement by said motor, the other slider being adjustable manually to designate a desired standard temperature for the furnace, a control bridge including a transformer having an alternating current energized primary winding and a pair of like secondary windings, a potentiometer having a movable contact, means connecting said secondary windings and said potentiometer in a closed circuit, a core movable relative to said primary and secondary windings for varying their inductive relationship, means for oscillating said core through a given path, an output circuit connected to said movable contact and to a point between said secondary windings, means for combining the voltage of said output circuit with the voltage between the sliders of said first mentioned control bridge, and phase sensitive means energized by the combined voltages and operating to control said devices.

10. A furnace control system comprising a furnace, a heater for said furnace, an "on" and "off" control device for the heating medium for said heater, a temperature indicating system for said furnace including a network having an element responsive to furnace temperature adapted to unbalance the same, and rebalancing means for the network including a reversible motor for indicating the degree of unbalance and hence the temperature, a balanceable control bridge having connected, commercial frequency alternating current energized potentiometers each with a slider, one slide being connected for movement by said motor, the other slider being adjustable manually to designate a desired standard temperature for the furnace, a control bridge including a 360° slidewire, means for moving a slider over said slidewire at a uniform rate, a potentiometer connected at its ends to said slidewire at points 180° apart, a slider for said potentiometer, means for connecting said last mentioned bridge across said potentiometer to a source of alternating current, a circuit including the sliders of each of said control bridges, said sliders connected in said circuits so as to combine the output voltages of said bridges, and phase sensitive means energized by the combined output voltages and operating to control said device.

11. A system for controlling a condition comprising, in combination, means for determining said condition, a controller for said determining means, a condition indicating apparatus including power means operating in response to changes in the condition, a control bridge including potentiometers connected in the closed circuit and each having a slider, means connecting one of said sliders for movement by said power means, the other slider being adjustable manually to designate a desired condition to be maintained, means connected across said potentiometers for energizing said bridge from a suitable voltage source, means including a second control bridge for producing a potential cycling periodically at a slow rate, means to combine said cycling potential with the potential between the sliders of said first mentioned control bridge, and phase sensitive means energized by the combined potentials and operating to control said controller.

12. The system of claim 11 in which said second control bridge includes a 360° slidewire, means for moving a slider over said slidewire at a uniform rate, a potentiometer connected to said slidewire at points 180° apart, a movable contact for said potentiometer, and an output circuit connected to said slider and said movable contact for delivering a cycling potential.

13. The system of claim 11 in which said second control bridge includes a transformer having a primary winding and a pair of like secondary windings, a core member movable relative to said primary and secondary windings for varying their inductive relationship, means for oscillating said core member in a given path, a potentiometer connected in a closed circuit with said secondary windings, a movable contact for said potentiometer, and an output circuit connected to said movable contact and to a point between said secondary windings for delivering a cycling potential.

ANTHONY J. HORNFECK.

REFERENCES CITED

The following references are of record in the file of this patent:

UNITED STATES PATENTS

| Number | Name | Date |
|---|---|---|
| 1,795,753 | Bonn | Mar. 10, 1931 |
| 2,220,028 | Smith | Oct. 29, 1940 |
| 2,246,186 | Prince | June 17, 1941 |
| 2,275,928 | Tophan | Mar. 10, 1942 |
| 2,300,537 | Davis | Nov. 3, 1942 |
| 2,333,393 | Ryder | Nov. 2, 1943 |
| 2,344,991 | Lilja | Mar. 28, 1944 |
| 2,359,651 | Krogh | Oct. 3, 1944 |
| 2,395,515 | Stoller | Feb. 26, 1946 |
| 2,409,136 | Lilja | Oct. 8, 1946 |
| 2,418,052 | Side | Mar. 25, 1947 |